United States Patent [19]

Supanz

[11] Patent Number: 5,251,987
[45] Date of Patent: Oct. 12, 1993

[54] PRESETTING DEVICE FOR TOOLS

[75] Inventor: Johannes Supanz, Hard, Austria

[73] Assignee: PWB AG, Altstätten, Switzerland

[21] Appl. No.: 830,696

[22] Filed: Feb. 4, 1992

[30] Foreign Application Priority Data

Feb. 4, 1991 [CH] Switzerland ............... 00333/91-8

[51] Int. Cl.⁵ .................. F16C 33/58; F16C 33/56
[52] U.S. Cl. .................................... 384/571; 384/576
[58] Field of Search .................. 384/571, 572, 576; 82/150

[56] References Cited

U.S. PATENT DOCUMENTS

| | | | |
|---|---|---|---|
| 1,188,592 | 6/1916 | Whitney | 384/571 |
| 1,600,534 | 9/1926 | Carr | 82/150 |
| 1,721,988 | 7/1929 | Davis et al. | 82/150 |
| 1,750,079 | 3/1930 | Wills | 82/150 |
| 2,362,265 | 11/1944 | Gnessin | 384/571 X |
| 2,565,284 | 8/1951 | Trbojevich | 384/563 |

FOREIGN PATENT DOCUMENTS 1951151 4/1971 Fed. Rep. of Germany.
26539 7/1972 Japan ............................. 384/571

Primary Examiner—Thomas R. Hannon
Attorney, Agent, or Firm—Martin A. Farber

[57] ABSTRACT

The presetting device for tools has an anti-friction bearing (13, 15) and a bearing sleeve (13) with an inner wall surface and an outer wall surface, the bore of which is provided in order to receive a conically developed bearing pin (3), with the also conical inner wall surface. The anti-friction bearing is developed as a needle bearing (13, 15). The bearing sleeve (13) also has a conical outer wall surface which is seated in the conical wall surfaces of a bearing bushing (9) and which is itself developed as needle-bearing sleeve (13) bearing the needle rollers (15).

9 Claims, 2 Drawing Sheets

PRESETTING DEVICE FOR TOOLS

FIELD AND BACKGROUND OF THE INVENTION

The present invention relates to a presetting device having an anti-friction bearing bushing for receiving the bearing pin of a tool to be measured, both the pin and the bushing having conical surfaces.

Types of such devices are used in so-called machining centers where a large number of replaceable tools or precision tools are present. They must be measured and preset in the presetting device prior to use, which is effected in the manner that the, generally conical, bearing pins of the tools are placed in the corresponding conical bearing sleeve of the device and measured—and if necessary also adjusted—in several positions by rotation within the bearing bushing.

Due to the weight of the tool itself, which may be considerable in the case of larger tools, rotation in the bearing sleeve is ordinarily scarcely possible or possible only with the application of a high force, since the friction between the surface of the pin and the inner surface of the cone of the bearing sleeve is relatively great. Specifically, however, upon the measuring of precision tools, it is necessary that the tools be easily rotatable within the bearing sleeve.

In accordance with a proposal known from Federal Republic of Germany A-1 951 151, it has been, attempted to remedy this problem by supporting the tool with a bearing sleeve with cylindrical outer wall surface via an anti-friction bearing rolling on said outer wall surface within a cylindrical bearing bushing. The disadvantage of this solution is that the two anti-friction bearings must agree very precisely since, otherwise, they give rise to inaccuracies. Such anti-friction bearings are extremely expensive. Furthermore, there is the danger that the bearing sleeve or the anti-friction bearing have play so that the required trueness of concentricity is no longer assured upon measurement.

SUMMARY OF THE INVENTION

The object of the present invention is, therefore, so to develop a device of the aforementioned type that it can satisfy the highest requirements. This object is achieved, in accordance with the invention, by use of a plastic or metallic conical sleeve with an array of needle bearing rollers disposed in openings of the sleeve, the sleeve with its rollers being located between an outer surface of the tool pin and an inner surface of the bushing.

While U.S. Pat. No. 2,565,284 has already proposed a needle bearing which, at first glance, has a certain similarity to the needle bearing used in the present invention, in accordance with that proposal bundles of needle rollers without any cage and separated only by strips of space holders are placed between the conical outer wall surface of a bearing sleeve and the conical inner surface of the bearing bushing, the bearing sleeve having a cylindrical inner wall surface. It is clear that also the use of such a needle bearing in a device in accordance with the said German publication can still not lead to the present invention, in which it is essential that the bearing sleeve bear the needles itself and thus has both conical inner and conical outer wall surfaces.

In accordance with the aforementioned U.S. Pat. No. 2,565,284, several needle rollers were, as already mentioned, separated from the adjacent number of needle rollers by, in each case, a space-holding strip. This leads to increased abrasion between the needle rollers which rub against each other, which necessarily resulted in extensive wear and further inaccuracies. As compared with this, it is of particular advantage in accordance with the invention to employ the features that the needle-bearing sleeve (13) has, in particular notch-like openings (e.g. 14) each of which surrounds an individual needle roller (15) in cage-like fashion.

Since a particularly high precision can be obtained by the invention, the use of a presetting device for the measuring and adjusting of a tool, particularly a precision tool, is preferred.

BRIEF DESCRIPTION OF THE DRAWINGS

Further details of the invention will become evident from the following description of an embodiment shown diagrammatically in the drawings, in which.

DETAILED DESCRIPTION OF THE PREFERRED EMBODIMENT

Figure 1:
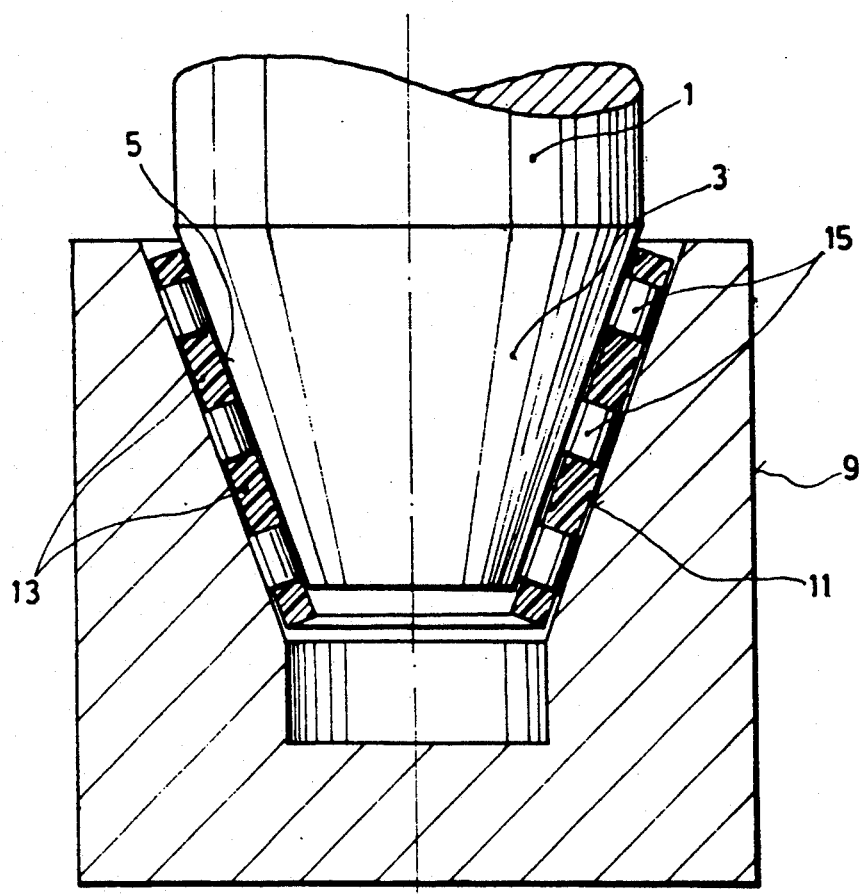
FIG. 1 is an axial section through the tool-receiving part of a device in accordance with the invention.

A precision tool 1 is inserted by its conical bearing pin 3 into a bearing bushing 9. Between the conical surface 5 of the bearing pin 3 and the conical inner wall surface 11 of the bearing bushing 9, there is a sleeve-like needle bearing having a needle-bearing sleeve 13 and a number of, preferably individual needle-bearing rollers 15 arranged therein (see, in particular, FIG. 3), the needle-bearing sleeve 13 bearing the needle rollers 15 in the manner of an anti-friction bearing cage.

The tool 1 can, for instance, be a precision tool such as used in so-called machining centers for the machining of workpieces of the metal industry. The bearing bushing 9 is the corresponding tool receiver of a presetting device for measuring and/or adjusting a tool before use.

By the sleeve-like needle bearing 13, 15 used, it is now readily possible to turn the tool 1 easily within the bearing bushing 9 without having to tolerate reductions in precision since the conical outer and inner wall surfaces of the needle-bearing sleeve 13 see to an exact fit and avoid any play.

In order, on the one hand, to take up little space between bearing bushing 9 and the tool surface 5 and, on the other hand, to permit cheap manufacture despite high precision, the needle-bearing sleeve 13 advantageously consists at least in part of a plastic. Polyamide, polyurethane and thermoplastic polyester have proven particularly suitable as plastic since, on the one hand, they have good sliding properties, while, on the other hand, they also have a relatively high resistance to abrasion. Of course, other plastics, such as tetrafluorethylene or polyethylene, can also be used, but the above-mentioned plastics are preferred, particularly if they are not too hard and brittle.

Of course, metallic materials, particularly steel, brass or aluminum, also enter into consideration for difficult working conditions.

Specifically when plastic is used, the forming of openings 14 which support the needle rollers 15 in cage-like manner is facilitated since the individual needle rollers 15 need then merely be pushed into the corresponding receiving notches 14. Another advantage of the use of a plastic is that the needle-bearing sleeve 13, due to its elastic deformability, need not be made with such great precision since the needle-bearing sleeve 13 can readily adapt itself precisely to the surfaces 5 and 11. In this case the manufacture is effected preferably by injection molding.

As a result of the conicity of the wall surfaces, there is, of course, a different speed of rotation. Therefore, it is preferred if at least two, and possibly even more than two, circles of needles 16 be provided on the needle-bearing sleeve 13 in order in this way to reduce the differences in circumferential speed. In this connection, it is advantageous for the needle rollers of all needle circles to be at least approximately of the same size.

In order, however, nevertheless to obtain a uniform distribution of the pressure of the tool 1 on the conical bearing surfaces, the needle rollers advantageously extend at least approximately over the entire axial length of the needle-bearing sleeve 13. However, at least two needle-bearing circles 16 should be provided in such a manner that one of them is directly adjacent the upper edge of the sleeve 13 and the other directly adjacent the lower edge, in order in this way to avoid injurious effects on the edges of the needle-bearing sleeve.

Figure 2:
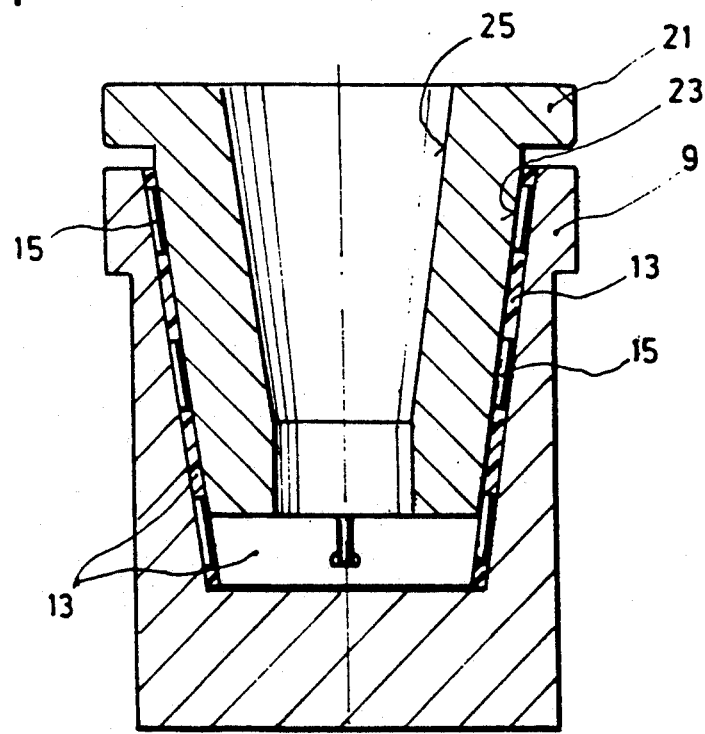
FIG. 2 is an axial section similar to FIG. 1, but after the insertion of a reduction sleeve.

In accordance with FIG. 2, a reduction sleeve 21 can be inserted into the bearing sleeve 13, the outer wall of said reduction sleeve being conically developed in such a manner that it corresponds precisely to the conicity of the bearing sleeve 13 and of the bearing bushing 9. The inner wall surface 25 of this reduction sleeve 21 can also be conical, but, if desired, it can also be cylindrical so that it acts as an adapter, since in this way it is possible to mount conical bearing pins of smaller diameter or cylindrical bearing pins in the bearing bushing 9 of the presetting device.

Figure 3:
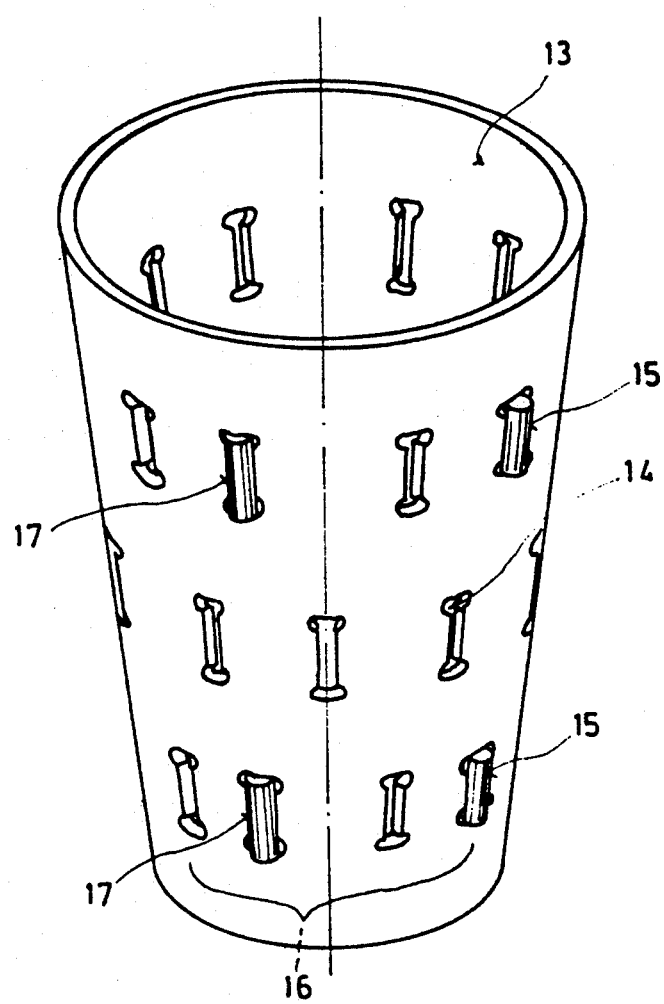
FIG. 3 is an axonometric view of the bearing sleeve used in accordance with the invention.

FIG. 3 shows a bearing sleeve 13 with its individual needle rollers 15 held in the notch-like receiving openings 14, the needle rollers 15 of the uppermost and lowermost circles of needles 16 being aligned with each other, which corresponds to a preferred embodiment. Such an arrangement namely permits a precise, play-free insertion of a bearing pin 3 into the bearing bushing 9. An intermediate circle of needles can, on the other hand, have staggered receiving openings 14 with needle rollers 15 in order not to excessively weaken the relatively thin sleeve 13 along each of its generatrices.

Figure 4:
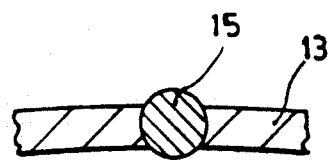
FIG. 4 is a cross section of a detail thereof on a larger scale showing the mounting of an individual needle roller on the needle roller sleeve.
Figure 5:
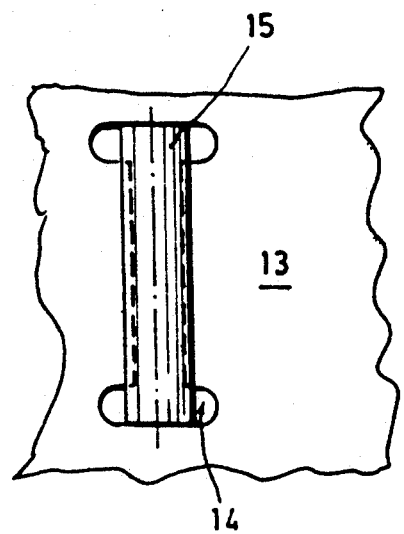
FIG. 5 is a top view of the needle roller and its support in the bearing sleeve, also on a larger scale.

A certain elasticity of the material used for the needle-bearing sleeve permits easy pushing of the needle rollers 15 into the receiving notches 14 of the needle-bearing sleeve 13, one of which notches is shown in FIG. 5. Such a notch 14 has on both of its sides a spring lip which, after the pushing of the needle roller 15 into place, is intended to spring back into its original position. The diameter of the needle roller 15 is, as shown in FIG. 4, somewhat greater than the wall thickness of the needle-bearing sleeve 13, so that the corresponding needle-bearing roller 15 protrudes on both sides of the wall of the sleeve 13. In this connection, the aforementioned good sliding properties of the plastic serve to facilitate the turning of the corresponding needle roller 15 within its receiving opening 14 and possibly even to exert a certain lubricating action. To be sure, the shape of the receiving openings 14 which is shown in FIG. 5 and is particularly favorable for simple insertion of the needle rollers 15 can also be different.

I claim:

1. A presetting device for a tool having a conical bearing pin, the device comprising
   an anti-friction bearing bushing for receiving the bearing pin of the too;
   a bearing assembly disposed between an inner conical wall surface of said bushing and an outer conical surface of said pin upon insertion of said pin in said device, said bearing assembly comprising a bearing sleeve and a plurality of needle bearing rollers;
   wherein said sleeve comprises a plurality of openings for enclosing and positioning respective ones of said rollers, each of said rollers extending beyond an outer surface of said sleeve to contact said bushing and extending beyond an inner surface of said sleeve to contact said pin upon insertion of sad pin in said device.

2. A device according to claim 1, wherein said sleeve is fabricated of a plastic material.

3. A device according to claim 2, wherein said is sleeve material is polyurethane, polyamide or thermoplastic polyester.

4. A device according to claim 1, wherein said sleeve is fabricated of a metallic material.

5. A device according to claim 1, wherein in said bearing assembly, said rollers are arranged in an array of at least two circles of rollers, said rollers in each circle are equal in size, and said circles are spaced apart along a central axis of said sleeve.

6. A device according to claim 5, wherein said circles of rollers are distributed over the entire axial length of said sleeve.

7. A device according to claim 5, wherein the rollers of two said circles are aligned with each other.

8. A device according to claim 5, wherein the rollers of two adjacent ones of said circles are staggered with respect to each other.

9. A device according to claim 5, wherein one of said circles of rollers is directly adjacent to one end of said sleeve, and a second of said circles of rollers is directly adjacent to a second end of said sleeve opposite said first end.

* * * * *